US012576780B2

(12) United States Patent
Nakaoka

(10) Patent No.: US 12,576,780 B2
(45) Date of Patent: Mar. 17, 2026

(54) LIGHT SOURCE DEVICE

(71) Applicant: Japan Display Inc., Tokyo (JP)

(72) Inventor: Chikyu Nakaoka, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 19/246,382

(22) Filed: Jun. 23, 2025

(65) Prior Publication Data

US 2025/0389403 A1     Dec. 25, 2025

(30) Foreign Application Priority Data

Jun. 24, 2024    (JP) ................................. 2024-101068

(51) Int. Cl.
| | |
|---|---|
| *B60Q 3/208* | (2017.01) |
| *F21V 8/00* | (2006.01) |
| *G02B 27/01* | (2006.01) |
| *G02F 1/1335* | (2006.01) |

(52) U.S. Cl.
CPC ........... *B60Q 3/208* (2017.02); *G02B 6/0016* (2013.01); *G02B 6/0018* (2013.01); *G02B 27/01* (2013.01); *G02F 1/133627* (2021.01)

(58) Field of Classification Search
CPC .... B60Q 3/208; G02B 6/0016; G02B 6/0018; G02B 27/01; G02F 1/133627
See application file for complete search history.

(56) References Cited

U.S. PATENT DOCUMENTS

| | | | | |
|---|---|---|---|---|
| 11,100,309 | B2 * | 8/2021 | Chung | ............... G06V 40/1324 |
| 2020/0201043 | A1 * | 6/2020 | Sugiyama | ................. G09F 9/00 |
| 2022/0365271 | A1 * | 11/2022 | Kijima | ................. G02B 6/0053 |

FOREIGN PATENT DOCUMENTS

| | | |
|---|---|---|
| JP | 2014-052584 A | 3/2014 |
| JP | 2023-063255 A | 5/2023 |

* cited by examiner

*Primary Examiner* — Keith G. Delahoussaye
(74) *Attorney, Agent, or Firm* — K&L Gates LLP

(57) ABSTRACT

According to an aspect, a light source device includes an optical element and a light source configured to emit emission light toward the optical element. The optical element integrally includes a body having a plate-like shape including a first plate surface that faces the light source and is tilted relative to an optical axis of the emission light, and prisms each having a triangular sectional shape and disposed on the first plate surface in a state of being separated from each other. Each of the prisms has a disposition surface disposed on the first plate surface, an entrance surface on which the emission light is incident, and a reflection surface that reflects, toward the first plate surface, the emission light incident through the entrance surface. An incident angle of the emission light relative to the reflection surface is equal to or larger than a critical angle of the reflection surface.

5 Claims, 3 Drawing Sheets

LIGHT SOURCE DEVICE

CROSS-REFERENCE TO RELATED APPLICATION

This application claims the benefit of priority from Japanese Patent Application No. 2024-101068 filed on Jun. 24, 2024, the entire contents of which are incorporated herein by reference.

BACKGROUND

1. Technical Field

What is disclosed herein relates to a light source device.

2. Description of the Related Art

Japanese Patent Application Laid-open Publication No. 2014-52584 (JP-A-2014-52584) discloses a headlight capable of controlling light distribution. The headlight of JP-A-2014-52584 reflects light from a light source by using a mirror, concentrates the reflected light with a lens, and projects light toward the front side of the vehicle. The direction of light projection is adjusted by adjusting the angle of the mirror.

Japanese Patent Application Laid-open Publication No. 2023-63255 (JP-A-2023-63255) discloses an illumination device including a lamp including a light source, and an arm coupled to the lamp. The arm includes a first arm and a second arm coupled to each other in a relatively rotatable manner. The lamp and the second arm are coupled to each other in a relatively rotatable manner. The emission direction of light from the light source is adjusted by adjusting the angle between the first and second arms and the angle between the lamp and the second arm.

In the devices disclosed in JP-A-2014-52584 and JP-A-2023-63255, the emission direction of light is adjustable. On the other hand, there is a desire to simultaneously emit light in two directions different from each other with a simple structure.

For the foregoing reasons, there is a need for a light source device configured to simultaneously emit light in two directions different from each other with a simple structure.

SUMMARY

According to an aspect, a light source device includes an optical element and a light source configured to emit emission light toward the optical element. The optical element integrally includes a body having a plate-like shape including a first plate surface that faces the light source and is tilted relative to an optical axis of the emission light, and a plurality of prisms each having a triangular sectional shape and disposed on the first plate surface in a state of being separated from each other. Each of the prisms has a disposition surface disposed on the first plate surface, an entrance surface on which the emission light is incident, and a reflection surface that reflects, toward the first plate surface, the emission light incident through the entrance surface. An incident angle of the emission light relative to the reflection surface is equal to or larger than a critical angle of the reflection surface.

DETAILED DESCRIPTION

Figure 1:
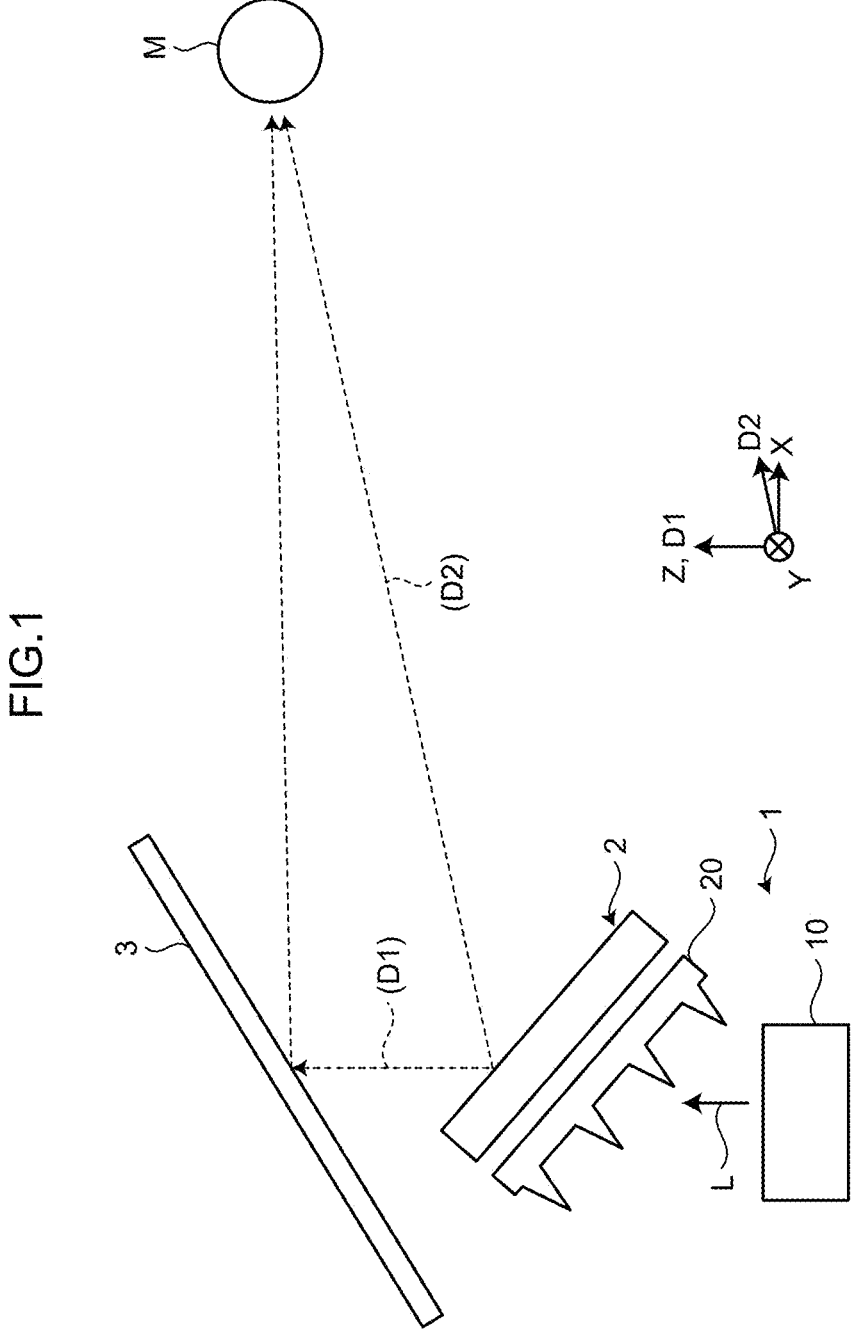
FIG. 1 is a conceptual diagram of a light source device according to an embodiment of the present disclosure.

An embodiment of the present disclosure is described below with reference to the drawings. Contents described below in the embodiments do not limit the present disclosure. Components described below include those that could be easily thought of by the skilled person in the art and those identical in effect. Components described below may be combined as appropriate.

What is disclosed herein is only an example, and any modifications that can be easily conceived by those skilled in the art while maintaining the main purpose of the present disclosure are naturally included in the scope of the present disclosure. The drawings may be schematically represented in terms of the width, thickness, shape, etc. of each part compared to those in the actual form for the purpose of clearer explanation, but they are only examples and do not limit the interpretation of the present disclosure. In the present specification and the drawings, the same reference sign is applied to the same elements as those already described for the previously mentioned drawings, and detailed explanations may be omitted as appropriate.

An X direction, a Y direction, and a Z direction illustrated in the drawings are orthogonal to one another. The X direction is the depth direction of a light source device 1, the Y direction is the width direction of the light source device 1, and the Z direction is the height direction of the light source device 1. The X, Y, and Z directions are exemplary, and the present disclosure is not limited to these directions. Each reference sign in parentheses added to a straight line illustrated in the drawings denotes the direction in which the straight line extends.

FIG. 1 is a conceptual diagram of the light source device 1 according to the embodiment of the present disclosure. The light source device 1 simultaneously emits light in two directions different from each other. The light source device 1 is applied as, for example, a backlight of a two-viewpoint display 2 mounted on a vehicle.

The two-viewpoint display 2 is, for example, a liquid crystal display and displays a first image in a first direction D1 and a second image in a second direction D2. The first direction D1 is the direction from the two-viewpoint display 2 to a light transmitting body 3 (for example, windshield) and is the same direction as the Z direction in the present embodiment. The first image is projected onto the light transmitting body 3 and visually recognized as a virtual image by a passenger M on the driver seat. The first image is, for example, a symbol indicating the speed or traveling direction of the vehicle.

The second direction D2 is the direction from the two-viewpoint display 2 to the passenger M on the driver seat. Specifically, the second direction D2 is orthogonal to the Y direction and tilted relative to the first direction D1. The second image is directly visually recognized by the passenger M on the driver seat. The second image is, for example, an image of a map.

The light source device 1 simultaneously emits light toward the two-viewpoint display 2 in each of the first direction D1 and the second direction D2. The first direction D1 and the second direction D2 are different from each other as described above. The light source device 1 includes a light source 10 and an optical element 20.

The light source 10 emits emission light L toward the optical element 20. The light source 10 emits the emission light L in the first direction D1. Accordingly, the emission light L has an optical axis in the first direction D1 (Z direction). The light source 10 includes, for example, a plurality of light emitting elements (not illustrated) such as light emitting diodes (LEDs) configured to emit light in the first direction D1.

The optical element 20 separates the direction in which the emission light L from the light source 10 travels into the first direction D1 and the second direction D2. Light emitted from the optical element 20 corresponds to light emitted from the light source device 1. The optical element 20 has a light-transmitting property. The optical element 20 is formed of, for example, thermoplastic resin or glass.

Figure 2:
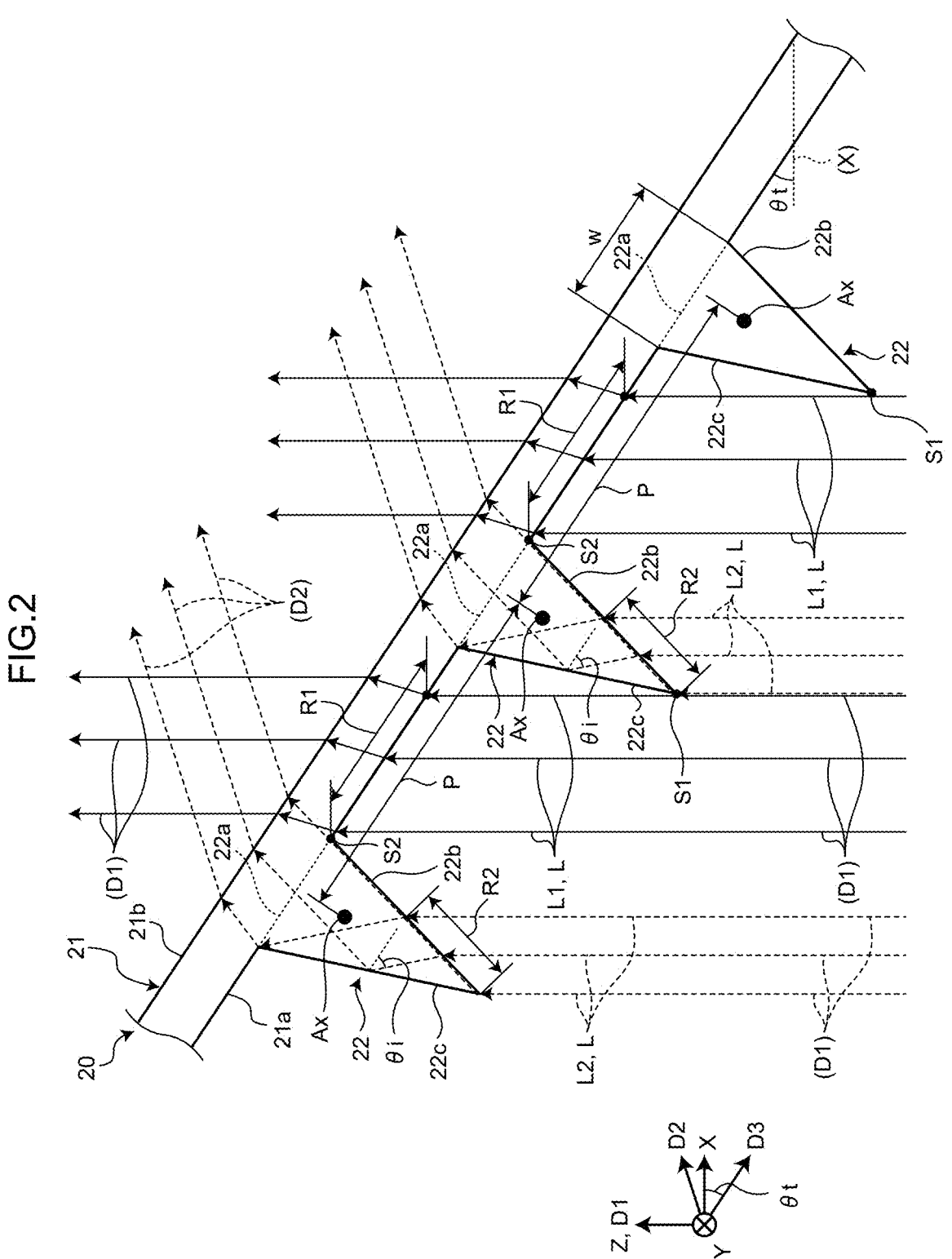
FIG. 2 is a partially enlarged sectional view of an optical element.

FIG. 2 is a partially enlarged sectional view of the optical element 20. The optical element 20 integrally includes a body 21 and a plurality of prisms 22.

The body 21 has a plate-like shape including a first plate surface 21a facing the light source 10 and a second plate surface 21b positioned opposite to the first plate surface 21a. The first plate surface 21a is tilted relative to the optical axis of the emission light L. In the present embodiment, the first plate surface 21a is parallel to the Y direction and tilted relative to the X direction and the first direction D1 (Z direction). A tilt angle $\theta t$ between the first plate surface 21a and the X direction is, for example, 10° to 70° inclusive. The tilt angle $\theta t$ is not limited to this range.

The second plate surface 21b is parallel to the first plate surface 21a.

Each prism 22 has a triangular prism shape extending along a central axis line Ax. Each prism 22 has a triangular sectional shape. The prisms 22 are disposed on the first plate surface 21a in a state of being separated from each other. The central axis lines Ax of the prisms 22 extend in the Y direction and are parallel to one another. The prisms 22 are arranged in a state of being parallel to one another.

Each prism 22 has a disposition surface 22a, an entrance surface 22b, and a reflection surface 22c. The disposition surface 22a, the entrance surface 22b, and the reflection surface 22c are each parallel to the Y direction.

The disposition surface 22a is disposed on the first plate surface 21a. In other words, the disposition surface 22a and the first plate surface 21a are disposed on the same plane.

The entrance surface 22b faces the light source 10. The emission light L from the light source 10 is incident on the entrance surface 22b.

The reflection surface 22c reflects, toward the first plate surface 21a, the emission light L incident through the entrance surface 22b. An incident angle $\theta i$ of the emission light L with respect to the reflection surface 22c is equal to or larger than the critical angle of the reflection surface 22c. In other words, the reflection surface 22c totally reflects the emission light L.

The prisms 22 are disposed at equal intervals. An array direction D3 in which the prisms 22 are arranged is orthogonal to the Y direction and parallel to the first plate surface 21a.

In the array direction D3, an interval P between two prisms 22 adjacent to each other corresponds to the distance between the central axis lines Ax of the two prisms 22. The emission light L from the light source 10 is directly incident on the first plate surface 21a from a portion between two prisms 22 adjacent to each other.

The following describes separation of the emission light L from the light source 10 through the optical element 20.

The description will be first made of the emission light L directly incident on the first plate surface 21a of the body 21 from the light source 10.

The emission light L from the light source 10 is directly incident on the body 21 through a first region R1 of the first plate surface 21a. The first region R1 corresponds to a region of the first plate surface 21a between a first side S1 and a second side S2, wherein the first side S1 is positioned between the entrance surface 22b and the reflection surface 22c of one of two prisms 22 adjacent to each other when the body 21 is viewed in the first direction D1, and the second side S2 is positioned between the entrance surface 22b of the other prism 22 and the first plate surface 21a. Hereinafter, the emission light L directly incident on the body 21 through the first region R1 of the first plate surface 21a from the light source 10 is referred to as "first emission light L1".

The first emission light L1 refracts at the first plate surface 21a in accordance with the refractive index of the optical element 20 and travels inside the body 21. In addition, the first emission light L1 refracts at the second plate surface 21b and exits from the body 21 in the first direction D1.

The following describes the emission light L incident through the entrance surface 22b of each prism 22 from the light source 10. The emission light L incident through the entrance surface 22b refracts in accordance with the refractive index of the optical element 20 and travels inside the prism 22. Part of the emission light L incident through the entrance surface 22b is reflected by the reflection surface 22c. Hereinafter, the emission light L incident through the entrance surface 22b from the light source 10 and reflected by the reflection surface 22c is referred to as "second emission light L2".

Accordingly, the second emission light L2 is incident on the prism 22 through a second region R2 of the entrance surface 22b. The second region R2 is a region where the emission light L (second emission light L2) incident through the entrance surface 22b travels toward the reflection surface 22c.

As described above, the second emission light L2 is totally reflected at the reflection surface 22c. The totally reflected second emission light L2 travels through the prism 22 and the body 21, refracts at the second plate surface 21b, and exits from the body 21. The second emission light L2 exits in the second direction D2.

Figure 3:
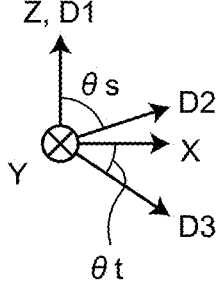
FIG. 3 is a partially enlarged view of the optical element illustrated in FIG. 2.

FIG. 3 is a partially enlarged view of the optical element 20 illustrated in FIG. 2. A separation angle $\theta s$ between the first direction D1 in which the first emission light L1 emitted from the light source device 1 travels and the second direction D2 in which the second emission light L2 emitted from the light source device 1 travels is given by Expressions (1), (2), (3), (4), and (5) below. In other words, a desired separation angle $\theta s$ can be determined based on Expressions (1), (2), (3), (4), and (5).

$$\varphi 1 = \theta 1 - \theta t \tag{1}$$

$$\sin\varphi 1 = n \times \sin\varphi 2 \tag{2}$$

$$\varphi 3 = \theta 1 + \theta 2 - \varphi 2 - 90° \tag{3}$$

$$\varphi 4 = \varphi 3 + \theta 2 - 90° \tag{4}$$

$$\theta s = \theta t + \sin^{-1}(n \times \sin\varphi 4) \tag{5}$$

In Expressions (1), (2), (3), (4), and (5), $\varphi 1$ is the incident angle of the second emission light L2 relative to the entrance surface 22b, $\varphi 2$ is the refraction angle of the second emission light L2 relative to the entrance surface 22*b*, φ3 is the angle between the reflection surface 22*c* and the direction in which the second emission light L2 incident on the reflection surface 22*c* travels, and φ4 is the incident angle of the second emission light L2 incident on the second plate surface 21*b*. In addition, n is the refractive index of the optical element 20, θ1 is the angle (hereinafter referred to as a first prism angle θ1; corresponding to a "second angle") between the entrance surface 22*b* and the disposition surface 22*a*, and θ2 is the angle (hereinafter referred to as a second prism angle θ2) between the reflection surface 22*c* and the disposition surface 22*a*.

The light quantity of the first emission light L1 and the light quantity of the second emission light L2 can be adjusted based on the interval P between two prisms 22 adjacent to each other in the array direction D3. The first image is desirably brighter than the second image when the first image is visually recognized as a virtual image and the second image is directly visually recognized as illustrated in FIG. 1.

As the interval P between two prisms 22 illustrated in FIG. 2 is larger, the first region R1 is larger and the light quantity of the first emission light L1 increases. On the other hand, as the interval P between two prisms 22 and a length w of the disposition surface 22*a* in the array direction D3 are larger, the first emission light L1 is more likely to be visually recognized in a divided state. Thus, the interval P between two prisms 22 and the length w of the disposition surface 22*a* in the array direction D3 are desirably smaller.

Specifically, in this case, the ratio of the length w of the disposition surface 22*a* to the interval P between two prisms 22 adjacent to each other in the array direction D3 is set to 0.50 to 0.95 inclusive. Accordingly, it is possible to prevent the first emission light L1 from being visually recognized in a divided state while setting the light quantity of the first emission light L1 to be larger than the light quantity of the second emission light L2. The ratio of the length w of the disposition surface 22*a* to the interval P between two prisms 22 adjacent to each other in the array direction D3 is not limited to 0.50 to 0.95 inclusive. In the present embodiment, the interval P between two adjacent prisms 22 is approximately 20 μm to 1000 μm inclusive, and the length w of the disposition surface 22*a* is approximately 5 μm to 100 μm inclusive, but the interval and the length are not limited to these magnitudes.

Preferable embodiments of the present disclosure are described above, but the present disclosure is not limited to such embodiments. Contents disclosed in the embodiments are merely exemplary, and various kinds of modifications are possible without departing from the scope of the present disclosure. Any modification performed as appropriate without departing from the scope of the present disclosure belongs to the technical scope of the present disclosure.

For example, the intervals between the prisms 22 are not limited to equal intervals.

The first prism angle θ1 and the second prism angle θ2 may be determined so that a light beam angle θr (corresponding to a "first angle") between the first plate surface 21*a* and the direction in which the second emission light L2 reflected by the reflection surface 22*c* travels, which is illustrated in FIG. 3, is equal to or larger than the first prism angle θ1 between the entrance surface 22*b* and the first plate surface 21*a*. In this case, the second emission light L2 reflected by the reflection surface 22*c* exits from the second plate surface 21*b* without traveling toward the entrance surface 22*b*. When the light beam angle θr is smaller than the first prism angle θ1, part of the second emission light L2 reflected by the reflection surface 22*c* is incident on the entrance surface 22*b* and exits in a direction different from the second direction D2. Thus, the second emission light L2 can be effectively used when the light beam angle θr is equal to or larger than the first prism angle θ1. The first prism angle θ1 is approximately 50° to 90° inclusive and the second prism angle θ2 is approximately 50° to 80° inclusive, but the angles are not limited to these magnitudes.

Moreover, the first prism angle θ1 and the second prism angle θ2 may be determined so that the light beam angle θr is equal to the first prism angle θ1. The light beam angle θr illustrated in FIG. 3 is equal to the first prism angle θ1.

In FIG. 3, the light beam angle θr increases while the second region R2 decreases when the reflection surface 22*c* is rotated about the first side S1 to change tilt of the reflection surface 22*c* so that the second prism angle θ2 increases without changing the first prism angle θ1. On the other hand, the second region R2 increases as the light beam angle θr decreases when the light beam angle θr is equal to or larger than the first prism angle θ1. Accordingly, In a case where the light beam angle θr is equal to or larger than the first prism angle θ1, the second region R2 is maximized when the light beam angle θr is equal to the first prism angle θ1. Thus, the emission light L from the light source 10 can be effectively used when the light beam angle θr and the first prism angle θ1 are equal to each other.

The light source device 1 may be applied to devices other than the two-viewpoint display 2 illustrated in FIG. 1. For example, the light source device 1 may be applied to a two-viewpoint display mounted on a vehicle and configured to display a first image toward a passenger on the driver seat and display a second image toward a passenger on the front passenger seat. In this case, the light source device 1 emits light in two directions of the direction from the two-viewpoint display toward the passenger on the driver seat and the direction from the two-viewpoint display toward the passenger on the front passenger seat. The light source device 1 may be an illumination device configured to emit light in two directions different from each other.

It should be understood that the present disclosure provides any other effects achieved by aspects described above in the present embodiment, such as effects that are clear from the description of the present specification or effects that could be thought of by the skilled person in the art as appropriate.

What is claimed is:

1. A light source device comprising:
an optical element; and
a light source configured to emit emission light toward the optical element, wherein
the optical element integrally includes
a body having a plate-like shape including a first plate surface that faces the light source and is tilted relative to an optical axis of the emission light, and
a plurality of prisms each having a triangular sectional shape and disposed on the first plate surface in a state of being separated from each other,
each of the prisms has
a disposition surface disposed on the first plate surface,
an entrance surface on which the emission light is incident, and
a reflection surface that reflects, toward the first plate surface, the emission light incident through the entrance surface, and
an incident angle of the emission light relative to the reflection surface is equal to or larger than a critical angle of the reflection surface.

2. The light source device according to claim 1, wherein
the body has a second plate surface positioned opposite to
the first plate surface, and
the second plate surface is parallel to the first plate
surface.

3. The light source device according to claim 1, wherein
a ratio of a length of the disposition surface of each of the
prisms to an interval between two of the prisms adjacent to
each other in an array direction in which the prisms are
arranged is 0.50 to 0.95 inclusive.

4. The light source device according to claim 1, wherein
a first angle between the first plate surface and a direction in
which the emission light reflected by the reflection surface
travels is equal to or larger than a second angle between the
entrance surface and the first plate surface.

5. The light source device according to claim 4, wherein
the first angle is equal to the second angle.

\* \* \* \* \*